US012797933B2

(12) United States Patent
Kim et al.

(10) Patent No.: US 12,797,933 B2
(45) Date of Patent: Nov. 17, 2026

(54) POUCH BENDING GUIDE APPARATUS AND POUCH BENDING METHOD FOR SECONDARY BATTERY PACKAGING SYSTEM USING STOPPING MEANS

(71) Applicant: MPLUS CORP, Chungcheongbuk-do (KR)

(72) Inventors: Jong Sung Kim, Gyeonggi-do (KR); Kang Ho Ko, Gyeonggi-do (KR); Hui Jin Park, Chungcheongbuk-do (KR); Bong Uk Jeong, Gyeongsangbuk-do (KR); Ji Eun Ahn, Daejeon (KR); Wook Kyoung Kim, Daejeon (KR); Sang Jun Park, Daejeon (KR)

(73) Assignee: SK ON CO., LTD., Seoul (KR)

( * ) Notice: Subject to any disclaimer, the term of this patent is extended or adjusted under 35 U.S.C. 154(b) by 612 days.

(21) Appl. No.: 17/916,754

(22) PCT Filed: Jun. 22, 2020

(86) PCT No.: PCT/KR2020/008048
§ 371 (c)(1),
(2) Date: Oct. 3, 2022

(87) PCT Pub. No.: WO2021/201338
PCT Pub. Date: Oct. 7, 2021

(65) Prior Publication Data

US 2023/0191467 A1 Jun. 22, 2023

(30) Foreign Application Priority Data

Apr. 2, 2020 (KR) ........................ 10-2020-0040220

(51) Int. Cl.
*B21D 5/01* (2006.01)
*H01M 10/04* (2006.01)

(52) U.S. Cl.
CPC ............ *B21D 5/01* (2013.01); *H01M 10/049* (2013.01)

(58) Field of Classification Search
CPC .......... B21D 5/01; B21D 11/20; B21D 11/22; B21D 37/10; B21D 37/12
See application file for complete search history.

(56) References Cited

U.S. PATENT DOCUMENTS 2,696,241 A * 12/1954 Larsen .................. B21D 25/02 72/305
4,713,957 A * 12/1987 Eder ...................... B21D 5/042 72/323

(Continued)

FOREIGN PATENT DOCUMENTS

CN 1759001 A 4/2006
CN 110402505 A 11/2019

(Continued)

OTHER PUBLICATIONS

International Search Report for the International Application No. PCT/KR2020/008048 issued by the International Searching Authority on Apr. 1, 2021.

(Continued)

*Primary Examiner* — Teresa M Ekiert
(74) *Attorney, Agent, or Firm* — IP & T GROUP LLP

(57) ABSTRACT

An embodiment of the present invention is a pouch bending guide apparatus, for a secondary battery packaging system, for folding a pouch sheet (2A) by folding a bending jig (20) toward a base jig (30) with the pouch sheet (2A) placed on the base jig (30) and bending jig (20), the pouch bending guide apparatus comprising a stopping means (42) provided at least inside the bending jig (20) so as to prevent a bending lateral surface (2BS) of a pouch (2) from being pressed inside the pouch (2) by supporting at least one surface of the (Continued)

pouch (2) formed when the pouch sheet (2A) is folded by means of the bending jig (20).

9 Claims, 7 Drawing Sheets

(56) References Cited

U.S. PATENT DOCUMENTS

| | | | | |
|---|---|---|---|---|
| 2013/0098135 | A1 * | 4/2013 | Golovashchenko | B21D 11/22 72/428 |
| 2017/0033327 | A1 | 2/2017 | Tajima | |
| 2019/0143624 | A1 * | 5/2019 | Hochapfel | B21D 11/22 72/383 |
| 2020/0035982 | A1 | 1/2020 | Choi | |
| 2022/0029192 | A1 | 1/2022 | Lee et al. | |

FOREIGN PATENT DOCUMENTS

| | | | | |
|---|---|---|---|---|
| CN | 116323149 | A | 6/2023 | |
| EP | 3035432 | A1 | 6/2016 | |
| JP | 2002-343318 | A | 11/2002 | |
| KR | 10-2002-0073373 | A | 9/2002 | |
| KR | 10-2013-0048419 | A | 5/2013 | |
| KR | 10-2015-0027500 | A | 3/2015 | |
| KR | 10-2015-0049969 | A | 5/2015 | |
| KR | 20-2015-0003358 | U | 9/2015 | |
| KR | 10-2016-0049709 | A | 5/2016 | |
| KR | 10-1672402 | B1 | 11/2016 | |
| KR | 10-2017-0012072 | A | 2/2017 | |
| KR | 10-1758959 | B1 | 7/2017 | |
| KR | 10-2017-0089276 | A | 8/2017 | |
| KR | 20180028200 | A | 3/2018 | |
| KR | 101858680 | B1 * | 5/2018 | H01M 10/0404 |
| KR | 10-2018-0073974 | A | 7/2018 | |
| KR | 101903367 | B1 | 10/2018 | |
| KR | 10-2019-0024755 | A | 3/2019 | |
| KR | 10-2019-0035338 | A | 4/2019 | |
| KR | 10-2015898 | B1 | 8/2019 | |

OTHER PUBLICATIONS

Extended European Search Report for the European Patent Application No. 20928648.3 issued by the European Patent Office on Mar. 5, 2024.

Office Action for U.S. Appl. No. 17/959,277 issued by the USPTO on Apr. 8, 2025.

Notice of Allowance for Chinese Patent Application No. 202080101453.7 issued by the Chinese Patent Office on Aug. 11, 2025.

Office Action for U.S. Appl. No. 17/959,277 issued by the USPTO on Nov. 28, 2025.

* cited by examiner

[FIG1]
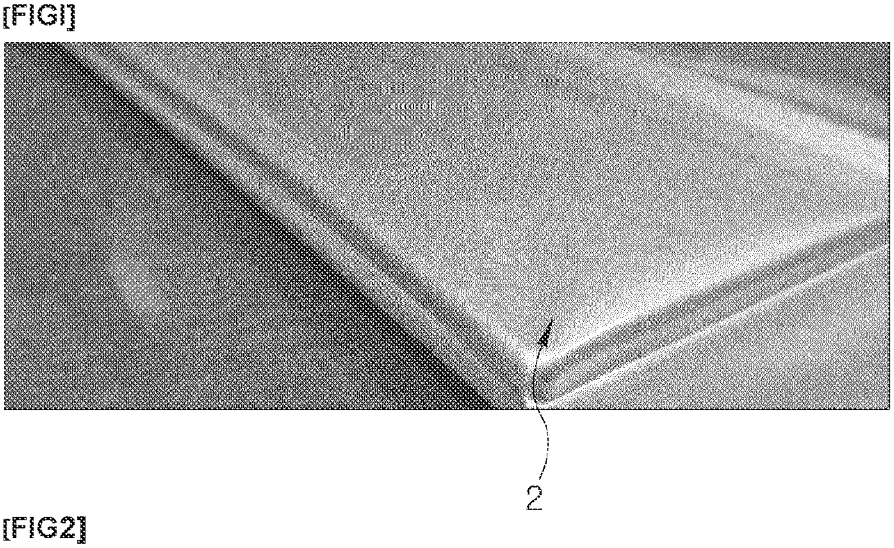
[FIG2]
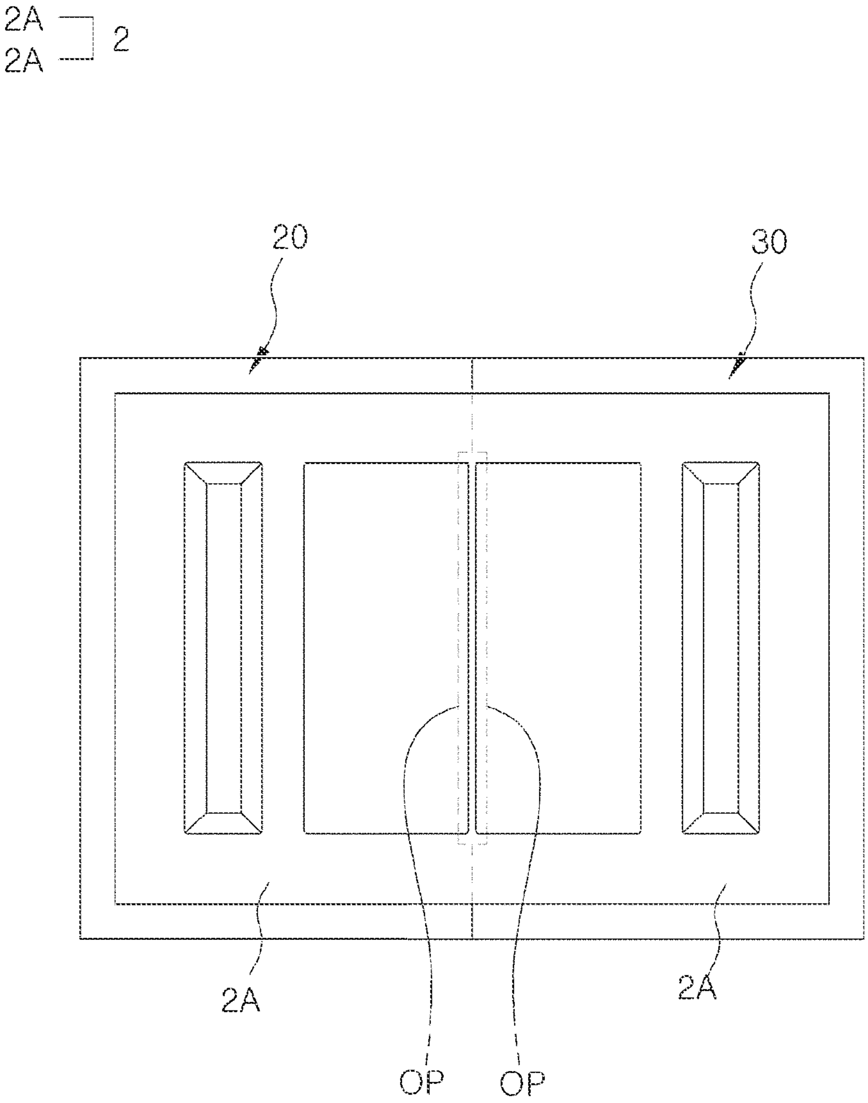

[FIG3]
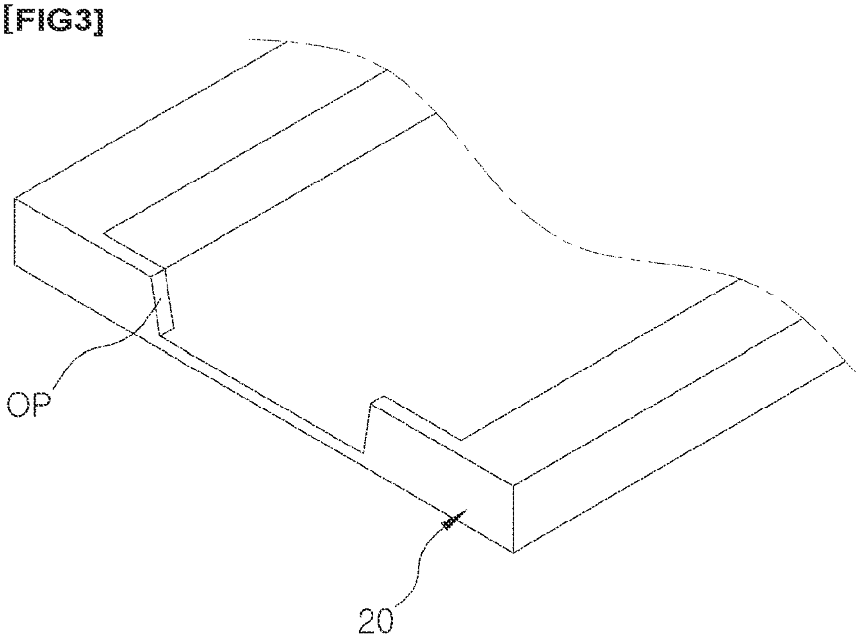
[FIG4]
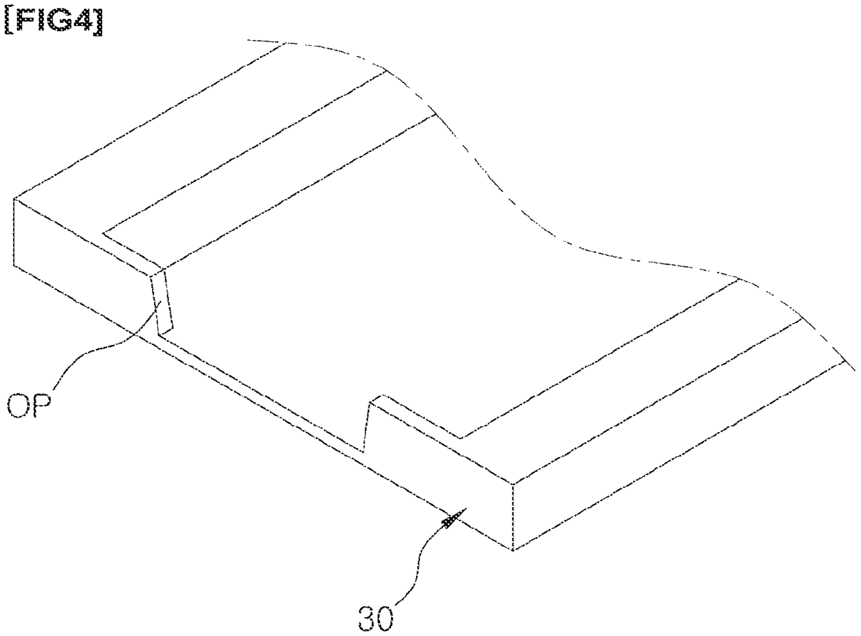

[FIG5]
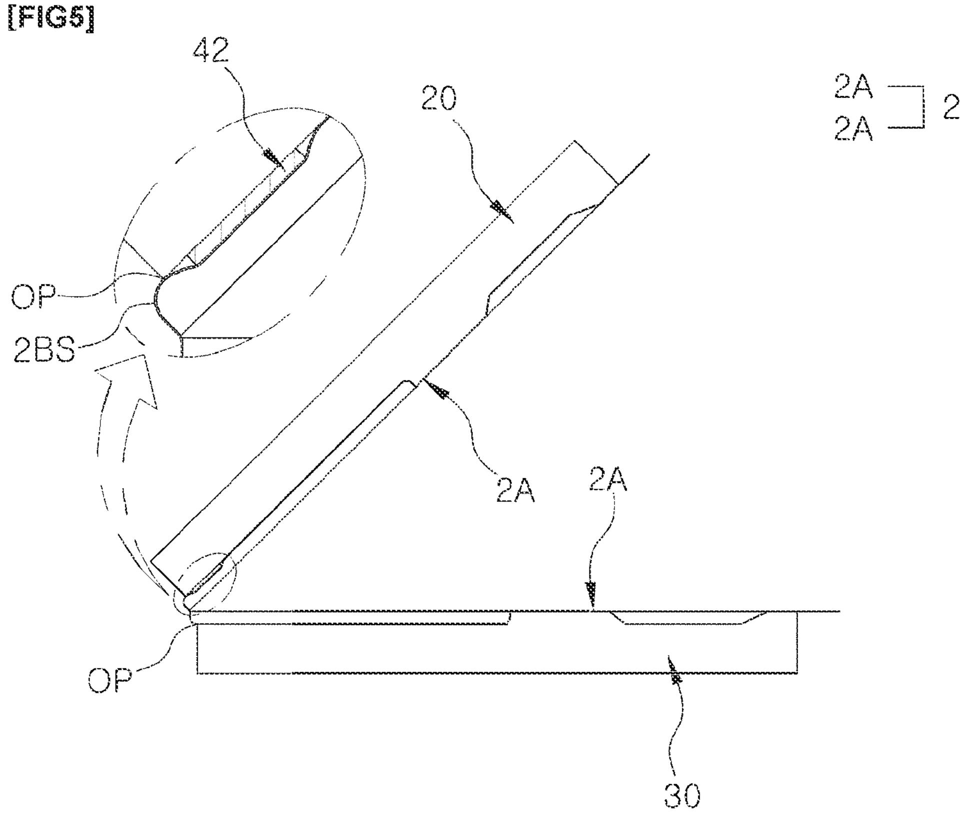
[FIG6]
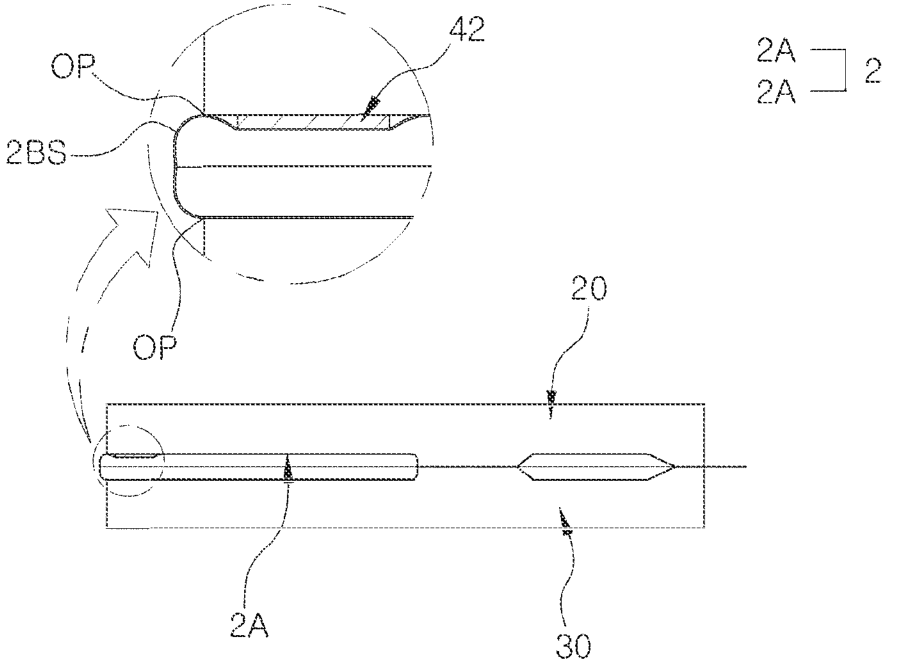

[FIG7]
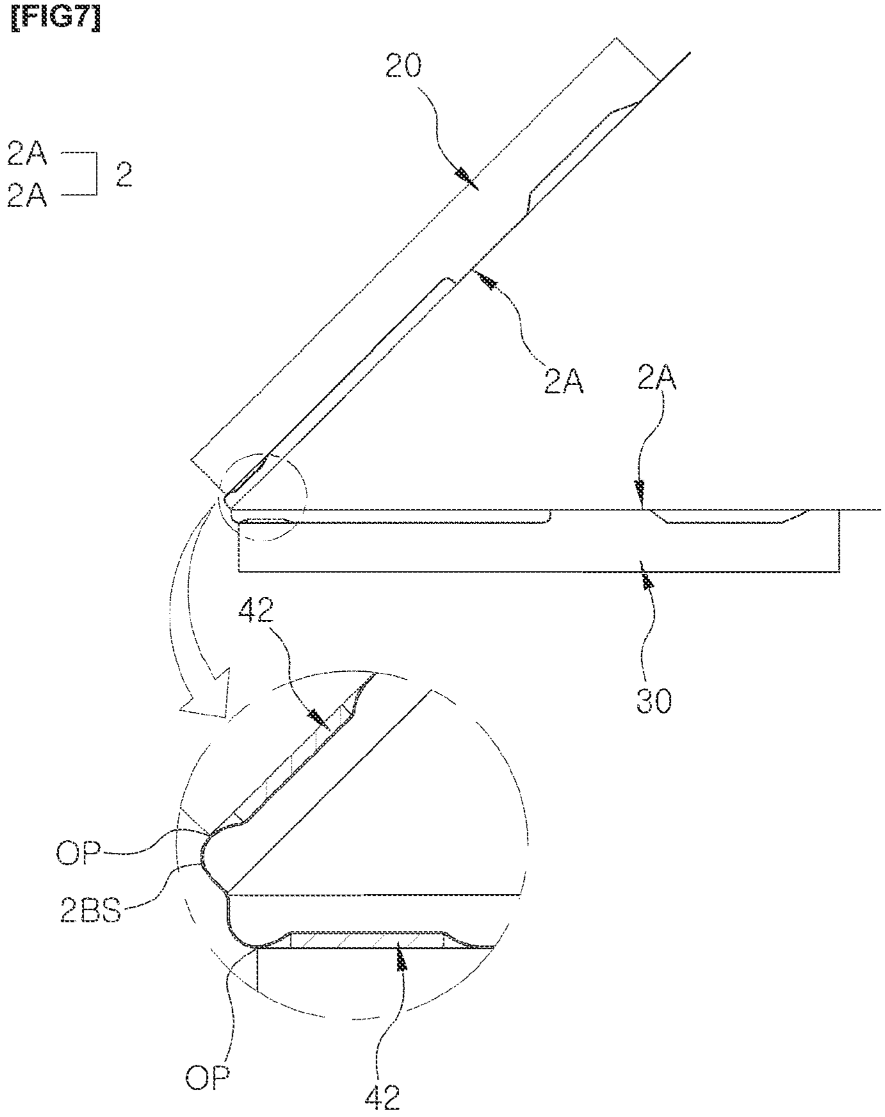

[FIG8]
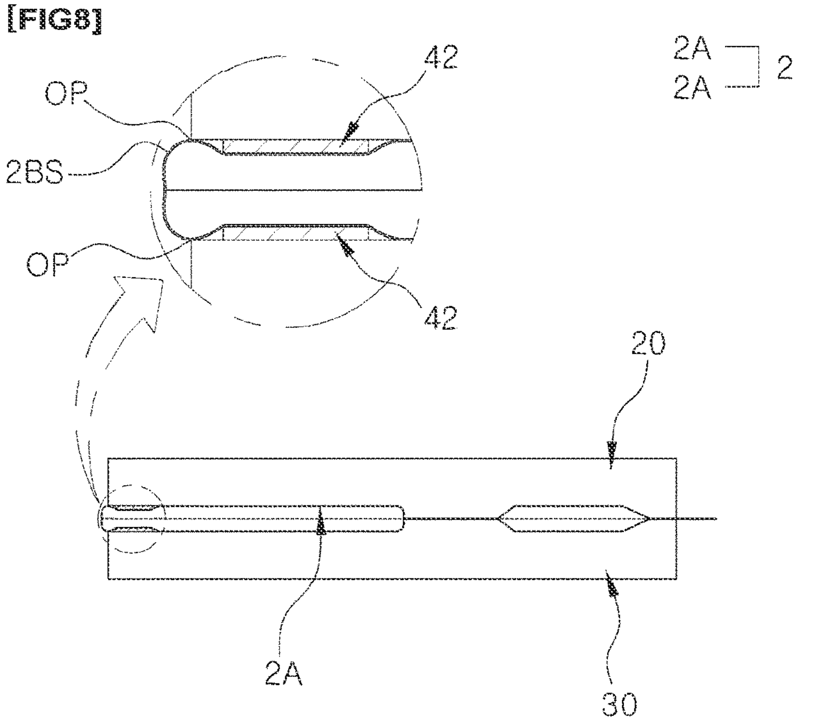
[FIG9]
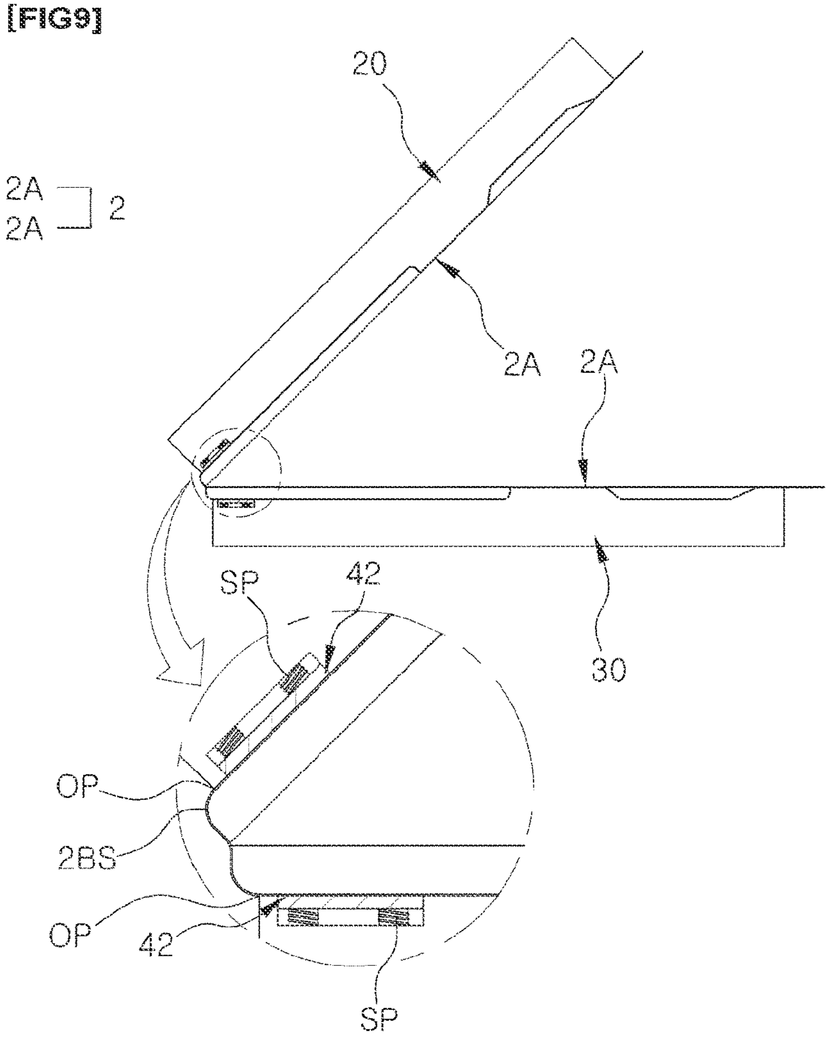

[FIG10]
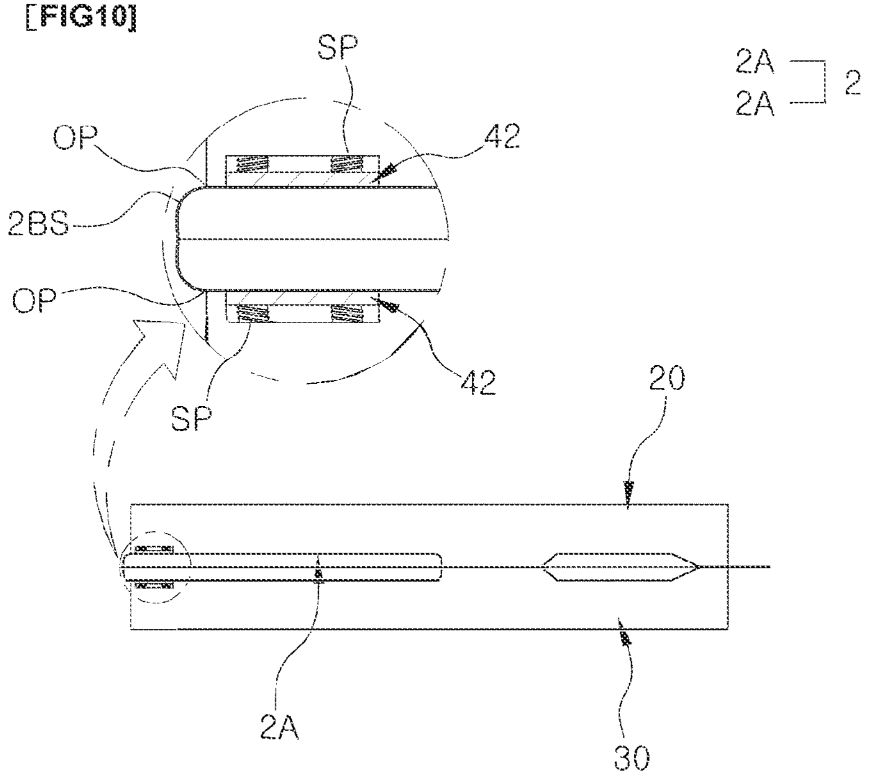
[FIG11]
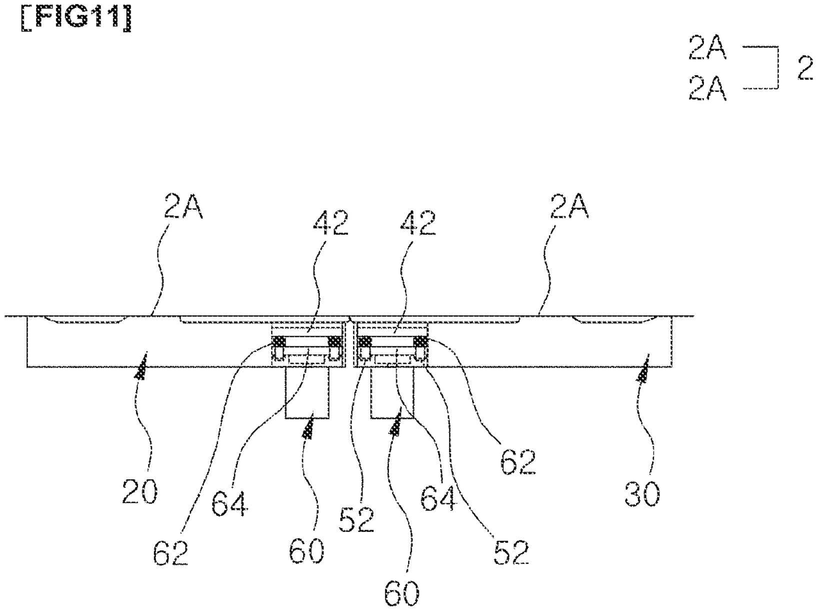

[FIG12]
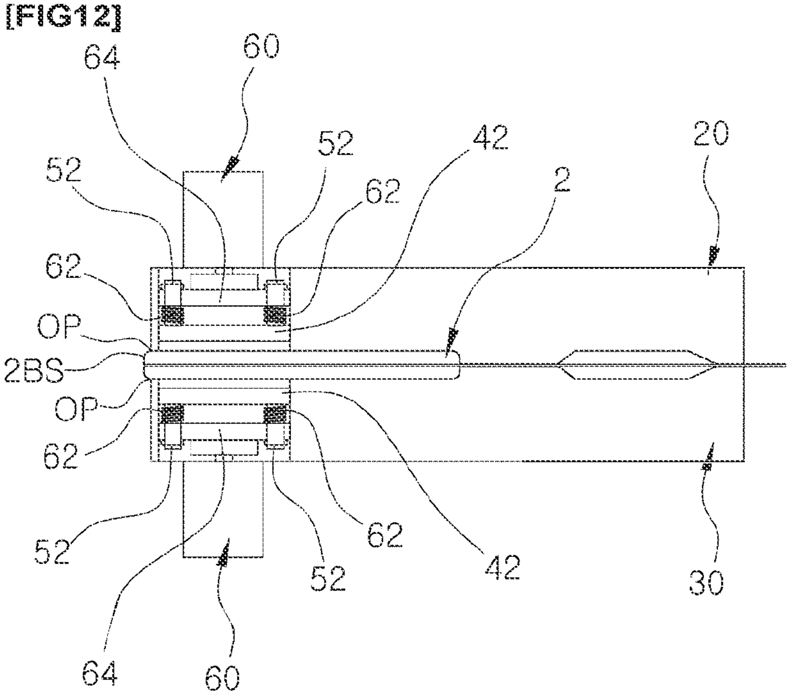
[FIG13]
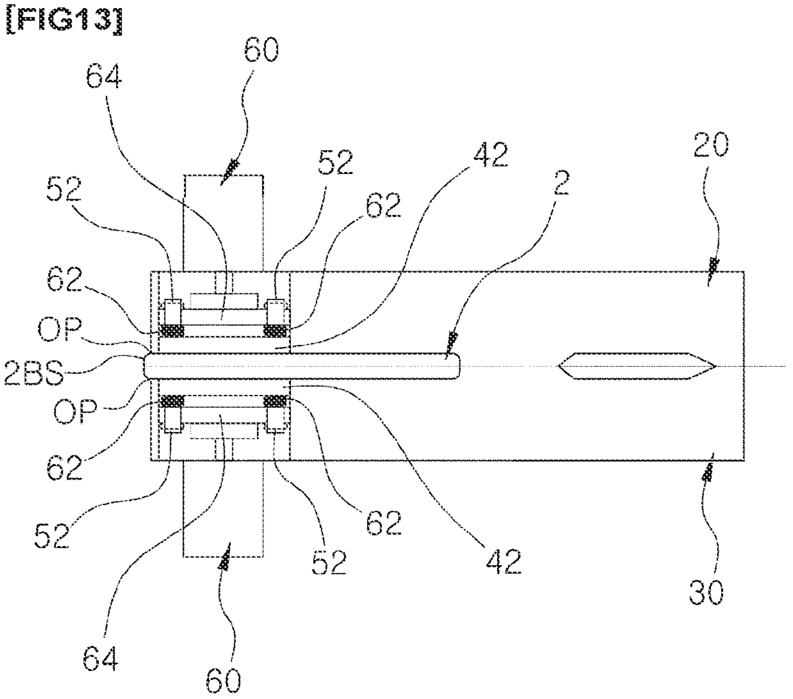

POUCH BENDING GUIDE APPARATUS AND POUCH BENDING METHOD FOR SECONDARY BATTERY PACKAGING SYSTEM USING STOPPING MEANS

TECHNICAL FIELD

The present disclosure relates to a pouch bending guide apparatus and a pouch bending method for a secondary battery packaging system using a stopping means, and more particularly, to a pouch bending guide apparatus and a pouch bending method for a secondary battery packaging system using a stopping means for preventing a bending side of the pouch from being concavely deformed in the bending operation for folding the pouch. The present disclosure relates to pouch bending in a secondary battery packaging system, and is to prevent the bending pouch from entering into the main room using a cylinder and a stopping means. To prevent the pouch from entering the main room means to prevent the phenomenon that the bending side of one side of the pouch is pushed into the interior of the pouch when the pouch sheet is folded to form the pouch.

BACKGROUND ART

Secondary batteries may be recharged and miniaturized and it is possible to increase the capacity. Secondary batteries may be classified into can-type or pouch-type secondary batteries according to the shape of the outer case, and the pouch-type secondary battery consists of a battery cell in which an electrode tab is formed on one side of the electrode plate, and a pouch enclosing and sealing the electrode plate so that the electrode tab is drawn out. The battery cell has a separator interposed between a plurality of positive and negative electrode plates, and the battery cell is sealed in a pouch, and the electrode tab on one side of the battery cell is drawn out to the outside of the pouch. A battery cell in which such a battery cell is embedded in a pouch is referred to as a pouch-type secondary battery.

Here, when forming a pouch in which the battery cells are embedded, the middle portion of the pouch sheet having a half-fold battery cell accommodating part is folded to embed the battery cells in the battery cell accommodating part inside the pouch.

However, there is a problem in that the bending side of the pouch 2 is concavely deformed inward as the middle portion of the pouch sheet is pushed in during the bending operation of folding the middle portion of the pouch sheet. In other words, when the pouch sheet is folded, the bending side of the pouch falls into the inside and there is a problem such as being concavely crushed.

In the case of a battery without a bottom, when the pouch is bent, the pouch 2 enters the main room, resulting in a smaller size of the main room. The fact that the pouch enters the main room means that the bending side of one side of the pouch is pushed into the inside of the pouch when the pouch sheet is folded to form a pouch, and as such, when the pouch is bent, a problem that the size of the main room of the pouch becomes smaller due to the pouch being brought into the main room occurs.

In addition, if the bending side of the pouch is concavely deformed inward, heat generated during the charging/discharging operation of the secondary battery battery cell is not properly discharged. A plurality of pouches with built-in battery cells (hereinafter, referred to as pouches for convenience) are placed side by side on the hanger frame and mounted, and the bending side of the pouch conducts and discharges the heat generated in the pouch during the battery cell charging/discharging operation from the bending side to the heat sink, in a state in contact with the heat sink (a metal plate with high thermal conductivity, which may be, for example, an aluminum plate) provided at the bottom of the hanger frame, and if there is a concave deformed part in which the bending side of the pouch is concave inward, since the concave deformed part does not properly contact the heat sink, there is a problem in that the heat generated in the pouch during the battery cell charging/discharging operation cannot be properly transferred to the heat sink from the bending side, so that the heat generated inside the pouch cannot be properly dissipated during the battery cell charging/discharging operation, and if the heat dissipation from the pouch is not properly done, there is also a problem that the battery cells are deteriorated or burned by heat.

DISCLOSURE OF THE INVENTION

Technical Goals

The present disclosure has been proposed to solve the problems of the related art as described above, and an object of the present disclosure is to provide a pouch bending guide apparatus and a pouch bending method for a secondary battery packaging system using a stopping means of a new configuration which may prevent the bending side of the pouch from being concavely deformed in the bending process of disposing the battery cell on the pouch sheet and folding the base jig and the bending jig, and smoothly dissipate heat generated during charging/discharging of secondary batteries from the pouch. In other words, the main object of the present disclosure is to prevent the bending side of the pouch from entering the inside in the process of bending the pouch sheet to embed the battery cell in the pouch.

Technical Solutions

According to the present disclosure to solve the problems as described above, there is provided a pouch bending guide apparatus of a secondary battery packaging system using a stopping means, which folds a pouch sheet while a bending jig is folded toward a base jig in a state where the pouch sheet is disposed on the base jig and the bending jig, characterized by including a stopping means for preventing a bending side of a pouch from being pushed into the pouch by supporting at least one side of the pouch formed when the pouch sheet is folded by the bending jig.

Advantageous Effects

The present disclosure is effective in solving the problem that the bending side of the pouch is concavely deformed inward by preventing the case in which the middle portion of the pouch sheet is pushed in during the bending operation of folding the middle portion of the pouch sheet.

In addition, the appearance quality of the pouch is improved and the reliability of the pouch is improved because the bending side of the pouch is not pushed inward.

BRIEF DESCRIPTION OF DRAWINGS

FIG. 1 is a photograph showing a portion of a pouch in which a concave deformed part is generated in which a bending side of a conventional pouch is concave inward.

FIG. 2 is a plan view illustrating an unfolded state of a base jig and a bending jig which are main parts of a pouch bending guide apparatus of a secondary battery packaging system using a stopping means, and a pouch sheet arranged on the base jig and the bending jig in an unfolded state in accordance with the present disclosure.

FIG. 3 is a perspective view illustrating a part of the bending jig illustrated in FIG. 2.

FIG. 4 is a perspective view illustrating a part of the base jig illustrated in FIG. 2.

FIG. 5 is a cross-sectional view illustrating a process of bending and forming a pouch by a pouch bending guide apparatus of a secondary battery packaging system using a stopping means in accordance with the present disclosure.

FIG. 6 is a cross-sectional view illustrating a state in which the bending jig illustrated in FIG. 5 is folded toward the base jig, and the stopping means supports the pouch to form a bending side of the pouch.

FIG. 7 is a cross-sectional view illustrating a process of bending and forming a pouch by a pouch bending guide apparatus of a secondary battery packaging system using a stopping means in accordance with another embodiment of the present disclosure.

FIG. 8 is a cross-sectional view illustrating a state in which the bending jig illustrated in FIG. 7 is folded toward the base jig, and the stopping means supports the pouch to form a bending side of the pouch.

FIG. 9 is a cross-sectional view illustrating a process of bending and forming a pouch by a pouch bending guide apparatus of a secondary battery packaging system using a stopping means according to another embodiment of the present disclosure.

FIG. 10 is a cross-sectional view illustrating a state in which the bending jig illustrated in FIG. 9 is folded toward the base jig, and the stopping means supports the pouch to form a bending side of the pouch.

FIG. 11 is a cross-sectional view illustrating an unfolded state of a base jig and a bending jig which are main parts of a pouch bending guide apparatus of a secondary battery packaging system using a stopping means according to another embodiment of the present disclosure.

FIG. 12 is a cross-sectional view schematically illustrating a state before the stopping means contact both sides of the pouch in a state where the bending jig shown in FIG. 11 is folded toward the base jig.

FIG. 13 is a cross-sectional view schematically illustrating a state in which the stopping means are in contact with both sides of the pouch in a state where the bending jig illustrated in FIG. 12 is folded toward the base jig.

BEST MODE FOR CARRYING OUT THE INVENTION

The present disclosure is a pouch bending guide apparatus of a secondary battery packaging system which folds a pouch sheet while a bending jig is folded toward a base jig in a state where the pouch sheet is disposed on the base jig and the bending jig, including a stopping means for preventing a bending side 2BS of a pouch from being pushed into the pouch by supporting at least one side of the pouch 2 formed when the pouch sheet is folded by the bending jig, and the stopping means is best formed by a pad provided on the inner surface of the bending jig.

Modes for Carrying Out the Invention

The present disclosure is a pouch bending guide apparatus of a secondary battery packaging system using a stopping means for preventing a bending side 2BS of a pouch 2 from being pushed into the pouch 2 when the pouch sheet 2A is folded by the bending jig 20 being folded toward a base jig 30 in a state where the pouch sheet 2A is disposed on the base jig 30 and the bending jig 20. The present disclosure is provided with a stopping means 42 as a main part. The stopping means 42 provided at least in the inside of the bending jig 20. The main feature is to prevent the bending side 2BS of the pouch 2 from being pushed into the pouch 2 by supporting the outer surface of the pouch 2 by the stopping means 42 when the pouch 2 is formed by a bending operation. In the present disclosure, when the pouch 2 is formed by bending the pouch sheet 2A, the stopping means 42 supports the battery cell accommodating part of the pouch 2 from the outside to prevent the bending side 2BS of the pouch 2 from being pushed into the pouch 2, and since the battery cell accommodating part of the pouch 2 is a configuration of the pouch 2, it will be understood that the stopping means 42 supports the pouch 2 from the outside.

The bending jig 20 is supported by the support frame and at the same time is folded into the inner surface of the base jig 30 by a bending driving unit and unfolded outward from the inner surface of the base jig 30. A concave half-fold pouch battery cell accommodating part seating groove is also provided on the inner surface of the bending jig 20. The pouch battery cell accommodating part seating groove of the bending jig 20 also has a rectangular groove shape.

The base jig 30 is mounted on a support frame, and one side wall of the base jig 30 and the bending jig 20 is connected to each other by a hinge part. The bending jig 20 is folded toward the inner surface of the base jig 30 so that the inner surface of the base jig 30 and the bending jig 20 face each other, and the bending jig 20 is unfolded outward from the inner surface of the base jig 30. The base jig 30 and the bending jig 20 are configured in a plate shape having a pouch battery cell accommodating part seating groove therein. Based on the hinge portion, the bending jig 20 is folded toward the base jig 30 and unfolded from the base jig 30.

In a state where the bending jig 20 is unfolded from the base jig 30, the inner surface of the bending jig 20 faces upward.

Preferably, a vacuum suction passage is provided inside the base jig 30 and the bending jig 20, and a plurality of vacuum suction holes communicating with the vacuum suction passage are provided on inner surfaces of the base jig 30 and the bending jig 20 facing each other. The vacuum suction hole of the base jig 30 is opened to the inner surface of the base jig 30 while being connected to the internal vacuum suction passage of the base jig 30. In addition, the vacuum suction hole of the bending jig 20 is also opened to the inner surface of the bending jig 20 while being connected to the internal vacuum suction passage of the bending jig 20.

The base jig 30 and the outer surface of the pouch sheet 2A placed on the inner surface of the bending jig 20 are disposed to face the vacuum suction hole of the base jig 30 and the vacuum suction hole of the bending jig 20.

The vacuum suction passage and the vacuum suction hole inside the base jig 30 and the vacuum suction passage and the vacuum suction hole inside the bending jig 20 are connected to a vacuum device (not shown) by a connecting hose, a vacuum connection block and a vacuum pressure filling block. By sucking air through the vacuum suction hole on the inner surface of the base jig 30 and the vacuum suction hole on the inner surface of the bending jig 20 by a vacuum device, the pouch sheet 2A can be closely adhered to the inner surface of the base jig 30 and the inner surface of the bending jig 20 by vacuum.

A vacuum device is connected to the vacuum suction passage of the base jig 30 and the bending jig 20 by a connecting means such as a hose not shown, so that the bending jig 20 is configured to fold toward the base jig 30 based on the hinge part or unfold based on the hinge part in a state where the base jig 30 and the bending jig 20 adsorb the pouch sheet 2A by the operation of the vacuum device. The operation of folding or unfolding the bending jig 20 on the base jig 30 may be performed by a bending operation means not shown. Since the bending operation means may use a known device such as a cylinder, a detailed description thereof will be omitted.

A pouch sheet 2A is disposed on the base jig 30 and the bending jig 20, a battery cell is accommodated in a half-fold battery cell accommodating part disposed on the base jig 30 among a pair of half-fold battery cell accommodating parts of the pouch sheet 2A, and in a state where the two half-fold battery cell accommodating parts of the pouch sheet 2A are seated in the pouch battery cell accommodating part seating groove inside each base jig 30 and the pouch battery cell accommodating part seating groove of the bending jig 20, as the bending jig 20 is folded toward the base jig 30, the pouch sheet 2A is folded, and the pouch sheet 2A is folded to form a pouch 2 in which a battery cell is embedded in an internal battery cell accommodating part.

One side walls of the base jig 30 and the bending jig 20 are connected to each other by a hinge part, and a bending guide opening part OP communicating with the inner and outer surfaces are formed on one sidewalls of the base jig 30 and the bending jig 20. The bending guide opening part OP is also formed on one side wall of the base jig 30, and is also formed on one side wall of the bending jig 20. In other words, the bending guide opening part OP formed on one side walls of the base jig 30 and the bending jig 20 communicates with one side wall of the base jig 30 and one side wall of the bending jig 20 from one side of the pouch battery cell accommodating part seating groove formed in the base jig 30 and the bending jig 20, respectively. The bending guide opening part OP guides the bending side 2BS of the pouch 2 to be pushed out when the stopping means 42 pushes the pouch 2 from the outside, and may be referred to as a guide hole for preventing the bending side 2BS of the pouch 2 from being pushed concavely into the pouch 2.

The stopping means 42 supports at least one side of the pouch 2 formed when the pouch sheet 2A is folded by the bending jig 20 so as to prevent the bending side 2BS of the pouch 2 from being pushed into the pouch 2. The stopping means 42 is formed of a pad provided on the inner surface of the bending jig 20. The stopping means 42 is formed of an elastic material such as a foamed urethane pad.

The stopping means 42 is configured in the shape of a square pad. The width between the left and right side ends of the stopping means 42 is equal to or slightly smaller than the width between the left and right side ends of the bending guide opening part OP.

A half-fold pouch battery cell accommodating part seating groove is provided inside the bending jig 20, and a pad-shaped stopping means 42 is provided at the inner bottom part of the half-fold pouch battery cell accommodating part seating groove.

The base jig 30 is also provided with a half-fold pouch battery cell accommodating part seating groove therein.

When the bending jig 20 is folded toward the base jig 30 based on the hinge part of one side, the half-fold pouch battery cell accommodating part seating groove inside the bending jig 20 and the half-fold pouch battery cell accommodating part seating groove inside the base jig 30 face each other, and the pad-shaped stopping means 42 is disposed on the inner inner surface of the half-fold pouch battery cell accommodating part seating groove of the bending jig 20, and in a state where the bending jig 20 is folded toward the base jig 30, the stopping means 42 is disposed at a position facing the internal inner surface of the half-fold pouch battery cell accommodating part seating groove of the base jig 30.

In addition, the present disclosure provide a pouch bending method for a secondary battery packaging system using a stopping means including a pouch bending operation for folding a pouch sheet 2A while a bending jig 20 is folded toward a base jig 30 in a state where the pouch sheet 2A is disposed on the base jig 30 and the bending jig 20, and a pouch support operation for preventing a bending side 2BS of a pouch 2 formed during the bending operation of the pouch sheet 2A from being pushed into the pouch 2, by a stopping means pushing at least one side of the pouch 2 from outside when the pouch sheet 2A is folded by the bending jig 20.

According to the present disclosure having the above configuration, at least the bending jig 20 is provided with the stopping means 42, and when the pouch sheet 2A is folded by the bending jig 20, by supporting at least one side of the pouch 2 from the outside by the stopping means 42, the bending side 2BS of the pouch 2 is prevented from being pushed into the inside of the pouch 2.

Here, the stopping means 42 is formed of a pad of elasticity having a certain area, and the physical properties of the stopping means 42 are configured to have elasticity to the extent that it is not deformed when the pouch 2 is bent and can be contracted when the jelly roll is put into the pouch 2.

In the present disclosure, the function of the stopping means 42 is to prevent the pouch 2 from being pushed into the inside of the bending side 2BS by pressing the pouch 2 when only the pouch 2 is bent.

However, in a state where the battery cell (jelly roll) is put into the pouch 2, the pouch 2 and the battery cell are subjected to force in the thickness direction by the stopping means 42, so that the pouch 2 is crushed or marks are formed.

Therefore, in the case of bending only the pouch 2 in order to properly stop, the stopping means 42 protrudes from the inner surfaces of the base jig 30 and the bending jig 20, and when the battery cell is put into the pouch 2, the stopping means 42 has a function of retracting inward. In the present disclosure, when the pouch 2 is bent when the battery cells are put into the pouch 2, a spring SP or a cylinder 60 is employed to prevent the pouch 2 from press marks or being crushed. This will be described later.

The base jig 30 and the bending jig 20 are unfolded based on the hinge part connected to each other, an on the inner surface of the base jig 30 and the bending jig 20, the pouch sheet 2A is unfolded, and each half-fold battery cell accommodating part of the pouch sheet 2A is seated in the half-fold pouch battery cell accommodating part seating groove inside the bending jig 20 and at the same time the stopping means 42 is interposed between the outer surface of the half-fold battery cell accommodating part of the pouch sheet 2A and the internal inner surface of the half-fold pouch battery cell accommodating seating groove inside the bending jig 20, and at the same time, the remaining half-fold battery cell accommodating part of the pouch sheet 2A is seated in the half-fold pouch battery cell accommodating part seating groove inside the base jig 30, and in this state, when the bending jig 20 is folded toward the base jig 30 based on the hinge part, the pouch sheet 2A is also folded in half from the unfolded state. This is the pouch bending operation.

In a state in which the bending jig 20 and the half-fold pouch sheet 2A are folded toward the base jig 30 and the other half-fold pouch sheet 2A, the stopping means 42 provided in the bending jig 20 is supporting the half-fold battery cell accommodating part of the pouch 2 from the outside, and at the same time, the internal inner surface of the half-fold pouch battery cell accommodating part seating groove of the base jig 30 supports the other half pouch battery cell accommodation part of the pouch 2 from the outside.

Accordingly, since the stopping means 42 supports at least one side of the pouch 2 (i.e., at least one side among both sides of the battery cell accommodating part of the pouch 2) from the outside, the bending side 2BS of the pouch 2 is not pushed inward. Here, the bending guide opening part OP communicating with the inner and outer surfaces are formed on one side walls of the base jig 30 and the bending jig 20, and since the stopping means 42 supports at least one side of the pouch 2 (i.e., at least one side among both sides of the battery cell accommodating part of the pouch 2), a case in which the bending side 2BS of the pouch 2 is pushed inward can be prevented while a force to unfold outwardly of the pouch 2 acts through the bending guide opening part OP. In other words, since the stopping means 42 supports at least one side of the pouch 2 from the outside, the pouch 2 is formed in a state where the bending side 2BS of the pouch 2 is not pushed inward. The bending jig 20 and the half-fold pouch sheet 2A are completely folded toward the base jig 30 and the other half-fold pouch sheet 2A, so that the pouch 2 in which the two half-fold pouch sheets 2A are overlapped can be formed.

Therefore, the present disclosure prevents the case where the middle portion of the pouch sheet 2A is pushed inward during the bending operation of folding the middle portion of the pouch sheet 2A so as to solve the problem that the bending side 2BS of the pouch 2 is deformed concavely inward. In other words, it solves a problem such as when the pouch sheet 2A is folded, the bending side surface 2BS of the pouch 2 goes inside and is concavely crushed.

Conventionally, in the case of a battery without a bottom, when the pouch 2 is bent, the pouch 2 enters the main room, resulting in a smaller size of the main room.

However, in the present disclosure, the pouch 2 is folded in half with the pouch sheet 2A in a state (in the present invention, a state where two stopping means 42 support both sides of the pouch 2) where at least one side of the pouch 2 is supported by the stopping means 42 with an adequate elastic force (adequate elastic force of the spring 62) to prevent the pouch 2 from entering the main room. The fact that the pouch 2 enters the main room means that when the pouch sheet 2A is folded to form the pouch 2, the bending side 2BS of one side of the pouch 2 is pushed into the interior of the pouch 2, and the present disclosure solves the problem that the main room size of the pouch 2 becomes smaller by preventing the pouch 2 from entering the main room during bending of the pouch 2 as described above.

Since the bending side 2BS of the pouch 2 is not pushed in, the external quality of the pouch 2 is improved and the reliability of the pouch 2 is improved.

In addition, when the bending side 2BS of the pouch 2 with built in battery cells is deformed to be concave inward, the problem that the heat generated during the charging/discharging operation of the secondary battery is not properly discharged is also solved. A plurality of pouches 2 with built in battery cells (hereinafter, referred to as pouch 2 for convenience) are placed side by side on a hanger frame and mounted, and the bending side 2BS of the pouch 2 is in contact with the heat sink provided at the bottom of the hanger frame, and the heat generated in the pouch 2 during the battery cell charging/discharging operation is conducted from the bending side 2BS to the heat sink, and discharged, wherein the bending side 2BS of the pouch 2 does not have a concave deformed part that is concave inward, so it is not that the concave deformed part of the pouch 2 does not properly contact the heat sink, but rather because the bending side 2BS of the pouch 2 protrudes more or is formed flat at least from the side of the pouch 2, the bending side 2BS of the pouch 2 is firmly in contact with the heat sink, resulting in the effect of properly dissipating the heat generated inside the pouch 2 during the battery cell charging/discharging operation by properly transferring the heat generated in the pouch 2 from the bending side 2BS to the heat sink during the battery cell charging/discharging operation.

In addition, as heat is properly dissipated from the pouch 2, there is an effect of solving the problem that the battery cells are deteriorated or burned out due to heat.

Meanwhile, FIGS. 5 and 6 show another embodiment of the present disclosure. In another embodiment of the present disclosure illustrated in FIGS. 5 and 6, the stopping means 42 is also provided inside the base jig 30 to which the bending jig 20 is connected via a hinge part. A pad-shaped stopping means 42 is also provided on the internal inner surface of the pouch battery cell accommodating part seating groove inside the base jig 30. In a state in which the bending jig 20 is folded toward the base jig 30 based on the hinge part, two pad-shaped stopping means 42 are disposed at positions facing each other.

According to another embodiment of the present disclosure, both the bending jig 20 and the base jig 30 are provided with the stopping means 42, and by supporting both sides of the pouch 2 from the outside by the two stopping means 42 when the pouch sheet 2A is folded by the bending jig 20, the bending side 2BS of the pouch 2 is prevented from being pushed into the inside of the pouch 2.

When the bending jig 20 is folded toward the base jig 30 based on the hinge part, the pouch sheet 2A is also folded in half from the unfolded state, and the stopping means 42 provided in the bending jig 20 is supporting the half-fold battery cell accommodating part of the pouch 2 from the outside in a state where the bending jig 20 and the half-fold pouch sheet 2A are folded toward the base jig 30 and the other half-fold pouch sheet 2A, and at the same time, the other stopping means 42 provided on the internal inner surface of the seating groove of the half-fold pouch battery cell accommodating part of the base jig 30 also supports the other half-fold pouch battery cell accommodating part of the pouch 2 from the outside.

Therefore, since the stopping means 42 supports both sides of the pouch 2 (i.e., both sides of the battery cell accommodating part of the pouch 2) from the outside, the bending side 2BS of the pouch 2 is not pushed inward. Here, the bending guide opening part OP communicating with the inner and outer surfaces are formed on one side walls of the base jig 30 and the bending jig 20, and since the stopping means 42 supports both sides of the pouch 2 (i.e., both sides of the battery cell accommodating part of the pouch 2), a case in which the bending side 2BS of the pouch 2 is pushed inward can be prevented while a force to unfold outwardly of the pouch 2 acts through the bending guide opening part OP. In other words, since the stopping means 42 supports both sides of the pouch 2 from the outside, the pouch 2 is formed in a state where the bending side 2BS of the pouch 2 is not pushed inward.

Since the effects of other embodiments of the present disclosure are the same as the effects of the above-described embodiments of the present disclosure, redundant descriptions thereof will be omitted. However, in another embodiment of the present disclosure, since the two stopping means 42 support both sides of the pouch 2 from the outside, there is an effect of more reliably preventing the case where the bending side of the pouch 2 is pushed into the inner surface of the pouch 2.

In the above embodiment, only the pouch 2 is bent in a state where the battery cell (jelly roll) is not put into the pouch 2, when only the pouch 2 is bent, the stopping means 42 presses the pouch 2 to prevent it from being pushed into the inside of the bending side 2BS of the pouch 2. Refer to FIGS. 5 to 8.

On the other hand, in the present disclosure, when the battery cells are put into the pouch 2, the stopping means 42 is configured to have a function of retracting inward. In the present disclosure, a spring SP or a cylinder 60 is employed so that the stopping means 42 has a function of retracting inward.

FIGS. 9 and 10 illustrate an embodiment in which a spring SP is employed to prevent the pouch 2 from press marks or the pouch from being crushed when the pouch 2 is bent in a state where the battery cell (jelly roll) is put in the pouch 2 in the present disclosure.

According to the present disclosure illustrated in FIGS. 9 and 10, the stopping means 42 is slidably embedded in the push operation hole formed in the bending jig 20, and a spring SP is interposed between the push operation hole and the stopping means 42, and it is configured such that the stopping means 42 can be retracted inward from the pouch 2 while the spring SP is supporting the stopping means 42.

When forming the pouch 2 by folding the bending jig 20 toward the base jig 30 in a state where the battery cell is built in the pouch 2, as the stopping means 42 is pushed into the inside of the bending jig 20 and the base jig 30 from the pouch 2, the spring SP is pressed, and since the force pressing in the thickness direction of the pouch 2 does not act and a pair of stopping means 42 support both sides of the pouch 2 from the outside, in the process of bending the pouch 2, the bending side 2BS is prevented from being pushed into the inside of the pouch 2, and at the same time, the pouch 2 is prevented from press marks or the pouch 2 is prevented from being crushed.

In other words, in the embodiment employing the spring SP in the present disclosure, when the pouch 2 is bent in the state where the battery cell (jelly roll) is put in the pouch 2, the stopping means 42 is pushed in from the pouch 2 so as to prevent the bending side 2BS of the pouch 2 from being pushed into the inside of the pouch 2 as well as to prevent the pouch 2 from press marks or the pouch 2 being crushed. In other words, the embodiment of the present disclosure illustrated in FIGS. 9 and 10 employs a spring SP so that proper stopping occurs when the pouch 2 is bent in a state where the battery cells are put into the pouch 2.

In addition, FIGS. 11 to 13 illustrate an embodiment in which the cylinder 60 is employed to prevent the pouch 2 from press marks or the pouch 2 from being crushed when the pouch 2 is bent in a state where a battery cell (jelly roll) is put into the pouch 2 in the present disclosure.

In the present invention illustrated in FIGS. 11 to 13, at least one of the base jig 30 and the bending jig 20 is provided with the stopping means 42, and the stopping means 42 supports at least one side of the pouch 2 from the outside, and the stopping means 42 is configured to be connected to the cylinder rod of the cylinder 60. In the present disclosure, two pad-shaped stopping means 42 are disposed on the internal inner surface of the half-fold pouch battery cell accommodating part seating groove inside the base jig 30 and the bending jig 20, and the two stopping means 42 are configured to be connected to the cylinder rods of the two cylinders 60.

Among the base jig 30 and the bending jig 20, at least the bending jig 20 is provided with the cylinder 60. The cylinder 60 is mounted on the outer surface of the bending jig 20. The inside of the bending jig 20 is provided with a push operation hole. The push operation hole may be configured to communicate from the inner surface to the outer surface of the bending jig 20. The push operation hole may be configured in a cross-sectional rectangular hole shape. In the present disclosure, a cylinder 60 is provided in each of the base jig 30 and the bending jig 20, and a push operation hole is provided in the base jig 30 and the bending jig 20. The push operation hole on the base jig 30 side communicates with the inner surface from the inside of the base jig 30, and the push operation hole on the bending jig 20 side communicates with the inner surface from the inside of the bending jig 20.

The stopping means 42 is coupled to the push operation hole of the base jig 30 and the bending jig 20 so as to move forward and backward. The stopping means 42 are configured to move forward toward the inner surface of the base jig 30 and the inner surface of the bending jig 20 in each push operation hole. The stopping means 42 is formed in a plate shape. When the push operation hole has a cross-sectional square hole shape, the stopping means 42 is configured in a square plate shape.

A guide bar 52 is built in the push operation hole. A plurality of guide bars 52 are disposed in the push operation hole.

A push operation plate 64 is connected to the cylinder rod provided in the cylinder 60 on the base jig 30 side and the cylinder rod provided in the cylinder 60 on the bending jig 20 side, respectively, and the push operation plate 64 is slidably coupled to the guide bar 52. The push operation plate 64 is disposed at a position facing the stopping means 42.

The cylinder rods of the cylinders 60 provided in the base jig 30 and the bending jig 20 are connected to the push operation plate 64.

The stopping means 42 is connected to the push operation plate 64. The stopping means 42 is connected to the push operation plate 64 via a connecting means such as a connecting bar (not shown).

A spring 62 is interposed between the push operation plate 64 and the stopping means 42. The spring 62 is interposed between the push operation plate 64 and the stopping means 42 in a state of being coupled to the outer circumferential surface of the guide bar 52. A spring 62 is interposed between the bottom surface of the push operation plate 64 and the top surface of the stopping means 42. When the cylinder rod of the cylinder 60 moves forward, the push operation plate 64 and the stopping means 42 move forward, and when the cylinder rod of the cylinder 60 moves backward, the push operation plate 64 and the stopping means 42 moves backward. In a state in which the push operation plate 64 and the stopping means 42 are moved forward, the spring 62 is compressed to retain elastic restoring force, and in a state where the push operation plate 64 and the stopping means 42 are moved backward, the spring 62 is unfolded.

According to another embodiment of the present disclosure illustrated in FIGS. 11 to 13, at least the bending jig 20 is provided with the stopping means 42, and when the pouch sheet 2A is folded by the bending jig 20, by supporting at least one side of the pouch 2 from the outside by the stopping means 42, the bending side 2BS of the pouch 2 is prevented from being pushed into the inside of the pouch 2. In the present disclosure, each of the base jig 30 and the bending jig 20 is provided with the stopping means 42, and the two stopping means 42 are configured to support both sides of the pouch 2 from the outside.

Specifically, the base jig 30 and the bending jig 20 are unfolded based on the hinge part connected to each other, and on the inner surface of the base jig 30 and the bending jig 20, the pouch sheet 2A is unfolded, and in such a state, when the bending jig 20 is folded toward the base jig 30 based on the hinge part, the pouch sheet 2A is also folded in half from the unfolded state.

In a state in which the bending jig 20 and the half-fold pouch sheet 2A are folded toward the base jig 30 and the other half-fold pouch sheet 2A, the cylinder rods of the cylinder 60 provided in the base jig 30 and the bending jig 20 move forward and the push operation plate 64 and the stopping means 42 move forward, so that the two stopping means 42 support both sides of the pouch 2 from the outside. Here, the spring 62 is compressed to have an elastic restoring force.

Then, since the stopping means 42 support both sides of the pouch 2 from the outside, the bending side 2BS of the pouch 2 is not pushed inward. Here, a bending guide opening part OP communicating with the inner and outer surfaces is formed on one side walls of the base jig 30 and the bending jig 20, and since the stopping means 42 support both sides of the pouch 2, a case in which the bending side 2BS of the pouch 2 is pushed inward can be prevented while a force to unfold outwardly of the pouch 2 acts through the bending guide opening part OP. Since the stopping means 42 supports both sides of the pouch 2 from the outside, the pouch 2 is formed in a state where the bending side 2BS of the pouch 2 is not pushed inward. The bending jig 20 and the half-fold pouch sheet 2A are completely folded toward the base jig 30 and the other half-fold pouch sheet 2A, so that the pouch 2 in which the two half-fold pouch sheets 2A are overlapped can be formed.

On the other hand, while the spring 62 is compressed to retain elastic restoring force, the elastic restoring force of the spring 62 is such that the force of the stopping means 42 pressing the pouch 2 inward is not applied and in a state where the stopping means 42 elastically holds the elastic restoring force enough to support both sides of the pouch 2 from the outside, when the stopping means 42 presses both sides of the pouch 2 with excessive force, it is possible to prevent the pouch 2 from being press marks or the pouch 2 from being crushed.

As illustrated in FIGS. 11 to 13, even in the present disclosure employing the cylinder 60, since the stopping means 42 is pushed inward from the pouch 2 and the force pressed by the stopping means 42 in the thickness direction of the pouch 2 does not act in the state in which the battery cell (jelly roll) is put in the pouch 2, the pouch 2 is prevented from press marks or being crushed. The embodiment of the present disclosure illustrated in FIGS. 11 to 13 also employs a cylinder 60 to properly stop the pouch 2 when bending the pouch 2 in a state where the battery cells are put into.

On the other hand, since the force of supporting the pouch 2 from the outside by stopping means 42 can be adjusted by adjusting the force of the cylinder rod of the cylinder 60 to move forward, there is an effect of more reliably preventing the pouch 2 from getting press marks by the stopping means or the pouch 2 from being crushed, and there is an effect that the clearance of the stopping means 42 can be easily and quickly adjusted by the cylinder 60 in response to the thickness of the pouch 2. By adjusting the clearance of the stopping means 42 corresponding to the thickness of the pouch 2, there is an effect that it can be used interchangeably even if the thickness of the pouch 2 is different.

INDUSTRIAL APPLICABILITY

A pouch bending guide apparatus of a secondary battery packaging system using a stopping means according to the present disclosure, is a pouch bending guide apparatus of a secondary battery packaging system which folds a pouch sheet while a bending jig is folded toward a base jig in a state where the pouch sheet is disposed on the base jig and the bending jig, including a stopping means for preventing a bending side 2BS of a pouch from being pushed into the pouch by supporting at least one side of the pouch 2 formed when the pouch sheet is folded by the bending jig, which has industrial applicability.

The invention claimed is:

1. A pouch bending guide apparatus of a secondary battery packaging system, wherein the pouch bending guide apparatus is configured to fold a pouch sheet to form a pouch, the pouch bending guide apparatus comprising:

one side wall of a bending jig and one side wall of a base jig directly connected together via a hinge part, wherein each of the base jig and the bending jig comprises a flat plate body having a pouch-accommodating-part seating groove recessed into an inner surface thereof, wherein the bending jig comprises a first stopper formed of a pad provided on the inner surface of the bending jig to support at least one side of the pouch while the pouch is formed from the pouch sheet by folding of the bending jig, and wherein the first stopper is configured to support an outer surface of the pouch to prevent a bending side of the pouch from being pushed into the pouch.

2. The pouch bending guide apparatus of claim 1, wherein the first stopper is slidably embedded in a push operation hole formed in the bending jig, and a spring is interposed between the push operation hole and the first stopper, so that the first stopper is configured to adjust a clearance according to a thickness of the pouch in a state where the spring supports the first stopper.

3. The pouch bending guide apparatus of claim 1, further comprising:

a second stopper provided inside the base jig;

wherein the first and second stoppers are respectively slidably embedded in a push operation hole formed in the bending jig and the base jig; and a spring interposed between the push operation hole and the first and second stoppers, so that the first and second stoppers are respectively configured to adjust a clearance according to a thickness of the pouch in a state where the spring supports the first and second stoppers.

4. The pouch bending guide apparatus of claim 1, further comprising:

a cylinder for moving the first stopper back and forth.

5. The pouch bending guide apparatus of claim 1, further comprising:

a second stopper provided inside the base jig; and wherein, when forming the pouch by folding the pouch sheet, the second stopper on the base jig side and the first stopper on the bending jig side are configured to support both outer surfaces of the pouch.

6. The pouch bending guide apparatus of claim 5, wherein a cylinder is provided outside each of the base jig and the bending jig, and each respective cylinder is configured to push the second stopper on the base jig side and the first stopper on the bending jig side.

7. The pouch bending guide apparatus of claim 6, wherein the cylinder is provided on an outer surface opposite to an inner surface of each of the base jig and the bending jig, a cylinder rod of the cylinder is provided with a push operation plate slidably coupled to a push operation hole, a guide bar positioned in the push operation hole is coupled to the push operation plate, and the first and second stoppers are each connected to the push operation plate.

8. The pouch bending guide apparatus of claim 1, wherein a bending guide opening part is formed on one side wall of the base jig and one side wall of the bending jig to communicate with inner and outer surfaces of the one side wall of the base jig and the one side wall of the bending jig, respectively.

9. A pouch bending method for a secondary battery, comprising:

providing the pouch bending guide apparatus of claim 1, and folding the bending jig toward the base jig to form the pouch from the pouch sheet.

* * * * *